United States Patent
Park et al.

(10) Patent No.: US 8,205,013 B2
(45) Date of Patent: Jun. 19, 2012

(54) METHOD AND SYSTEM FOR AGGREGATING THE CONTROL OF MIDDLEWARE CONTROL POINTS

(75) Inventors: Hoyong Park, San Jose, CA (US); Praveen Kumar, San Jose, CA (US); Alan Messer, Los Gatos, CA (US); Victor Zhu, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 944 days.

(21) Appl. No.: 11/121,820

(22) Filed: May 2, 2005

(65) Prior Publication Data

US 2006/0248233 A1      Nov. 2, 2006

(51) Int. Cl.
*G06F 15/16* (2006.01)
(52) U.S. Cl. .......................... 709/249; 709/227
(58) Field of Classification Search .............. 709/227, 709/249; 370/825
See application file for complete search history.

(56) References Cited

U.S. PATENT DOCUMENTS

| | | | |
|---|---|---|---|
| 5,544,321 A | 8/1996 | Theimer et al. | |
| 5,555,376 A | 9/1996 | Theimer et al. | |
| 5,611,050 A | 3/1997 | Theimer et al. | |
| 5,812,865 A | 9/1998 | Theimer et al. | |
| 5,910,799 A | 6/1999 | Carpenter et al. | |
| 6,169,991 B1 | 1/2001 | Tsukahara | |
| 6,256,019 B1 | 7/2001 | Allport | |
| 6,389,288 B1 | 5/2002 | Kuwahara et al. | |
| 6,563,430 B1 | 5/2003 | Kemink et al. | |
| 6,618,764 B1 * | 9/2003 | Shteyn | 709/249 |
| 6,640,218 B1 | 10/2003 | Golding | |
| 6,748,462 B2 | 6/2004 | Dubil | |
| 6,791,467 B1 | 9/2004 | Ben-Ze'ev | |
| 6,817,028 B1 | 11/2004 | Jerding | |
| 6,822,698 B2 | 11/2004 | Clapper | |
| 6,823,519 B1 | 11/2004 | Baird | |
| 6,857,128 B1 | 2/2005 | Borden | |
| 6,859,197 B2 | 2/2005 | Klein | |
| 6,954,737 B2 | 10/2005 | Kalantar et al. | |
| 6,957,075 B1 | 10/2005 | Iverson | |
| 6,986,133 B2 | 1/2006 | O'Brien et al. | |

(Continued)

FOREIGN PATENT DOCUMENTS

EP      1168124      1/2002

(Continued)

OTHER PUBLICATIONS

Nevo for IPAQ, http://www.mynevo.com/html.php?page_id=5, downloaded Oct. 19, 2006.

(Continued)

*Primary Examiner* — Djenane Bayard
*Assistant Examiner* — Carlos Perez Toro
(74) *Attorney, Agent, or Firm* — Beyer Law Group LLP

(57) ABSTRACT

A method of aggregating control in a first network and a second network, the first network having first devices and the second network having second devices. A communication channel is established between the first and second networks; from the first network the second devices in the second network are discovered through the communication channel; and from the first network one of the second devices in the second network is controlled through the communication channel. The first and second network can be connected but isolated. Further, the first and second networks can implement different network protocols, or the same network protocol.

27 Claims, 4 Drawing Sheets

U.S. PATENT DOCUMENTS

| | | | |
|---|---|---|---|
| 7,024,256 | B2 | 4/2006 | Krzyzanowski et al. |
| 7,046,263 | B1 | 5/2006 | Abbott et al. |
| 7,064,675 | B2 | 6/2006 | Zigmond et al. |
| 7,076,255 | B2 | 7/2006 | Parupudi et al. |
| 7,170,422 | B2 | 1/2007 | Nelson et al. |
| 7,184,848 | B2 | 2/2007 | Krzyzanowski et al. |
| 7,206,559 | B2 | 4/2007 | Meade, II |
| 7,237,260 | B2 * | 6/2007 | Yu et al. .......................... 726/11 |
| 7,307,746 | B2 | 12/2007 | Inoue |
| 7,336,942 | B2 | 2/2008 | Wang |
| 7,337,217 | B2 | 2/2008 | Wang et al. |
| 7,346,663 | B2 | 3/2008 | Abbott et al. |
| 7,522,549 | B2 | 4/2009 | Karaoguz et al. |
| 7,533,079 | B2 | 5/2009 | Naito et al. |
| 7,613,285 | B2 | 11/2009 | Ha et al. |
| 7,640,546 | B2 | 12/2009 | Zarenin et al. |
| 2001/0032132 | A1 | 10/2001 | Moran |
| 2001/0033554 | A1 * | 10/2001 | Ayyagari et al. ............... 370/328 |
| 2001/0047431 | A1 * | 11/2001 | Eytchison ..................... 709/249 |
| 2002/0130834 | A1 | 9/2002 | Madarasz et al. |
| 2002/0138327 | A1 | 9/2002 | Mello et al. |
| 2003/0009537 | A1 * | 1/2003 | Wang ............................ 709/219 |
| 2003/0046401 | A1 | 3/2003 | Abbott et al. |
| 2003/0110298 | A1 * | 6/2003 | Lanigan ........................ 709/246 |
| 2003/0208569 | A1 | 11/2003 | O'Brien et al. |
| 2004/0230636 | A1 | 11/2004 | Masuoka et al. |
| 2005/0097478 | A1 | 5/2005 | Killian et al. |
| 2005/0246726 | A1 | 11/2005 | Labrou et al. |
| 2006/0064693 | A1 | 3/2006 | Messer et al. |
| 2006/0064694 | A1 | 3/2006 | Messer et al. |
| 2006/0069602 | A1 | 3/2006 | Messer et al. |
| 2006/0075100 | A1 * | 4/2006 | Stirbu .......................... 709/225 |
| 2006/0147001 | A1 | 7/2006 | Ha et al. |
| 2006/0156252 | A1 | 7/2006 | Sheshagiri et al. |
| 2006/0156307 | A1 | 7/2006 | Kunjithapatham et al. |
| 2007/0220529 | A1 | 9/2007 | Sheshagiri et al. |
| 2007/0266384 | A1 | 11/2007 | Labrou et al. |
| 2007/0279389 | A1 | 12/2007 | Hoch |
| 2008/0270999 | A1 | 10/2008 | Goring et al. |

FOREIGN PATENT DOCUMENTS

| | | |
|---|---|---|
| FR | 2852173 | 9/2004 |
| KR | 20010041425 | 5/2001 |
| KR | 20020022049 | 3/2002 |
| WO | 0038039 | 6/2000 |
| WO | 0039964 | 7/2000 |
| WO | 0169380 | 9/2001 |
| WO | 2004081713 | 9/2004 |
| WO | WO2005003967 | 1/2005 |

OTHER PUBLICATIONS

U.S. Non-final Office Action, U.S. Appl. No. 11/444,994, filed May 31, 2006 mailed Apr. 27, 2009.

U.S. Final Office Action mailed on Sep. 3, 2010 for U.S. Appl. No. 11/444,994.

U.S. Non-Final Office Action mailed on Sep. 15, 2010 for U.S. Appl. No. 11/725,376.

U.S. Final Office Action for U.S. Appl. No. 11/444,994 mailed on Dec. 8, 2009.

U.S. Non-final Office Action for U.S. Appl. No. 11/444,994 mailed on Apr. 7, 2010.

Berners-Lee, T. et al., "The Semantic Web: A new form of Web content that is meaningful to computers will unleash a revolution of new possibilities", Scientific American.com, May 17, 2001, pp. 1-5, http://www.sciam.com, United States.

"DAML+OIL Specification", Mar. 2001, pp. 1-13, http://www.daml.org/2001/03/daml+oil, United States.

Kopena, J.B. et al., "DAMLJessKB: A tool for reasoning with the Semantic Web". IEEE Intelligent Systems, 2003, pp. 74-77, vol. 18(3), United States.

Connolly, D. et al., "DAML+Oil (Mar. 2001) Reference Description," W3C Note, Dec. 18, 2001, pp. 1-17, http://www.w3.org/tr/daml+oil+reference, United States.

Hill, E., "Jess, the Rule Engine for the Java Platform", Java Expert System Shell, http://herzberg.ca.sandia.gov/jess/, United States.

"OWL Web Ontology Language Reference", WC3 Semantic Web, Dec. 9, 2003, http://www.daml.org/2002/06/webont/owl-ref-proposed.html, United States.

Haarslev, V. et al., "Description of the Racer System and its Applications", In Proceedings of the International Workshop in Description Logics 2001 (DL2001), Aug. 2001, Stanford, pp. 701-705, http://citeseer.ist.psu.edu/article/haarslev01description. html, United States.

Hendler, J. et al., "Integrating Applications on the Semantic Web," Journal of the Institute of Electrical Engineers of Japan, Oct. 2002, pp. 676-680, vol. 122(10), United States.

Milojicic, D. et al., "Appliance Aggregation Architecture (A3)", HP Labs Technical report HPL-2002-277, Jul. 3, 2003, pp. 1-10, United States.

Chakraborty, D. et al., "DReggie: Semantic Service Discovery for M-Commerce Applications", Workshop on Reliable and Secure Applications in Mobile Environment, in Conjunction with 20th Symposium on Reliable Distributed Systems (SRDS), Oct. 12, 2001, pp. 1-6, http://ebiquity.umbc.edu/paper/html/id/49/, United States.

Avancha, S. et al., "Enhanced Service Discovery in Bluetooth", IEEE Computer, Jun. 28, 2002. pp. 96-99, vol. 35, University of Maryland, Baltimore County, United States.

Gonzalez-Castillo, J. et al., "Description Logics for Matchmaking of Services", Hewlett-Packard Company, 2001, pp. 1-13, http://www.hpl.hp.com/techreports/2001/HPL-2001-265.pdf, Bristol, United Kingdom.

Sycara, K. et al., "Larks: Dynamic Matchmaking among Heterogeneous Software Agents in Cyberspace", Autonomous Agents and Multi-Agent Systems, 2002, pp. 173-203, Kluwer Academic Publishers, http://www-2.cs.cmu.edu/~softagents/papers/LARKS.pdf, United States.

Paolucci, M. et al., "Semantic Matching of Web Services Capabilities", In First Int. Semantic Web. Conf. 2002, pp. 333-347, http://citeseer.ist.psu.edu/paolucci02semantic.html, United States.

Kumar, R. et al., "User-Centric Appliance Aggregation", HP Labs Technical Report HPL-2002-277, Oct. 2, 2002. pp. 1-16, United States.

European Search Report and Search Opinion; Application No. 06250036.8-1525; dated Sep. 17, 2007.

Masuoka, R. et al., "Task Computing—The Semantic Web meets Pervasive Computing—," pp. 866-881, Oct. 2003 Proceedings, in D. Fensel et al. (Eds.), "The Semantic Web—ISWC 2003," the Second International Semantic Web Conference (ISWC 2003), Sanibel Island, FL, USA, LNCS 2870.

Lashina, T. et al., "The context aware personal remote control: a case study on context awareness", Published 2003, pp. 1-6, United States.

Berners-Lee, T. et al., WC3 Semantic Web, Technology and Society Domain, "Semantic Web", pp. 1-5, http://www.w3.org/2001/sw/, United States.

U.S. Non-Final Office Action for U.S. Appl. No. 10/947,774 mailed Dec. 15, 2008.

U.S. Non-Final Office Action for U.S. Appl. No. 10/948,399 mailed Mar. 17, 2009.

U.S. Non-Final Office Action for U.S. Appl. No. 10/950,121 mailed Dec. 19, 2008.

U.S. Non-Final Office Action for U.S. Appl. No. 11/200,546 mailed Jun. 16, 2009.

U.S. Advisory Action for U.S. Appl. No. 11/200,546 mailed Jan. 22, 2009.

U.S. Final Office Action for U.S. Appl. No. 11/200,546 mailed Oct. 15, 2008.

U.S. Non-Final Office Action for U.S. Appl. No. 11/200,546 mailed Apr. 25, 2008.

U.S. Non-Final Office Action for U.S. Appl. No. 11/444,994 mailed Apr. 27, 2009.

U.S. Final Office Action for U.S. Appl. No. 11/394,968 mailed Feb. 12, 2009.

U.S. Non-Final Office Action for U.S. Appl. No. 11/394,968 mailed Aug. 25, 2008.

Korean Office Action dated Jan. 4, 2007 from Korean Application No. 10-2005-0111999.

Korean Notice of Allowance dated Mar. 8, 2007 from Korean Application No. 10-2005-0111999.
Office Action dated Dec. 15, 2011 from U.S. Appl. No. 11/444,994.
Notice of Allowance dated Jun. 2, 2011, from U.S. Appl. No. 11/725,376.

Final Office Action dated Mar. 7, 2011, from U.S. Appl. No. 11/725,376.
Office Action dated Dec. 27, 2010, from U.S. Appl. No. 11/444,994.

* cited by examiner

METHOD AND SYSTEM FOR AGGREGATING THE CONTROL OF MIDDLEWARE CONTROL POINTS

FIELD OF THE INVENTION

The present invention relates to control of middleware, and in particular to control of middleware in home networks.

BACKGROUND OF THE INVENTION

Many middlewares for networks such as home networks use two device types: control points (controllers) and controlled devices. Control points manipulate devices by discovering devices and controlling devices. It is desirable for control points to discover all devices in the network in order to control all the devices. However, there are cases where control points can discover only a limited number of devices or control only a few of the devices because of network configuration (such as multiple routers) or usage of special hardware (such as firewire).

For example, Universal Plug and Play (UPnP) defines a control protocol in a network of interconnected device, wherein the first step in UPnP networking is discovery. When a device is added to the network, the UPnP discovery protocol allows that device to advertise its services to control points (e.g., controllers) in the network. Similarly, when a control point is added to the network, the discovery protocol allows that control point to search for devices of interest in the network.

The UPnP discovery protocol relies on multicast over IP in the network. If a network configuration uses multiple routers, multicast packets from a control point for discovery may not be visible for another control point. This is because multicast is not always forwarded between networks. In that case, control points in the network are separated into groups and controls for devices are limited only to devises "visible" to the control points.

Home Audio Visual Interoperability Architecture (HAVi) uses firewire for discovery. If a control point does not have firewire port, it cannot discover any of devices in the firewire network. HAVi to UPnP bridges can be used to connect HAVi devices to UPnP devices or vice versa. However, the bridges are designed with only specific home network middlewares with limited functionalities and do not provide a general method of aggregating control points.

There is therefore a need for a method and system for aggregating the control of middleware control points in a network.

BRIEF SUMMARY OF THE INVENTION

The present invention addresses the above problems. In one embodiment, the present invention provides a method and system whereby the control points in a network can discover all of devices in the network and to control the devices by using communication a channel between control points.

In one version, such a method of aggregating control in a first network and a second network, the first network having first devices and the second network having second devices, comprises the steps of: establishing a communication channel between the first and second networks; from the first network discovering the second devices in the second network through the communication channel; and from the first network controlling a second device in the second network through the communication channel. The first and second network can be connected but isolated. Further, the first and second networks can implement different network protocols, or the same network protocol.

The method can further include the steps of maintaining a device table in the second network, wherein the device table includes a local address and a corresponding proxy address for each of one or more of the second devices. The step of discovering second devices in the second network further includes the steps of obtaining the proxy address for said one or more second devices from the device table for accessing one of the second devices from the first network using the proxy address through the communication channel. Alternatively, the step of controlling the second devices in the second network further includes the steps of obtaining the proxy address for that second device from the device table, and accessing that second device from the first network using the proxy address through the communication channel.

The method can further include the steps of: from the second network discovering the first devices in the first network through the communication channel; and from the second network controlling a first device in the first network through the communication channel. Further, a device table is maintained in the first network, wherein the device table includes a local address and a corresponding proxy address for each of one or more of the first devices. In that case, the step of discovering the first devices in the first network further includes the steps of obtaining the proxy address for said one or more first devices from the device table for accessing a first device from the second network using the proxy address through the communication channel. Alternatively, the step of controlling a first device in the first network further includes the steps of obtaining the proxy address for that first device from the device table, and accessing that first device from the second network using the proxy address through the communication channel.

In another embodiment the present invention provides a system for aggregating control in a first network and a second network, the first network having a first control point and first devices and the second network having a second control point and second devices, the system comprising: a first aggregator for the first network; and a second aggregator for the second network; wherein the first and second aggregators establish a communication channel therebetween whereby the first control point discovers and controls the second devices in the second network via the communication channel. The system can further include a device table in the second network, wherein the device table includes a local address and a corresponding proxy address for one or more of the second devices. In that case, the first control point discovers the devices in the second network by further obtaining the proxy address for each of one or more second devices from the device table. Alternatively, the first control point further obtains the proxy address for one of the second devices from the device table to control that second device using the proxy address through the communication channel via the first and second aggregators.

In addition, the second control point can discover the first devices in the first network through the communication channel via the first and second aggregators. The second control point further controls one of the first devices in the first network through the communication channel via the first and second aggregators. The system can also include a device table in the first network, wherein the device table includes a local address and a corresponding proxy address for each of one or more of the first devices. In that case, the second control point further discovers the first devices in the first network by obtaining the proxy address for said one or more first devices from the device table. Alternatively, the second control point further controls a first device in the first network by obtaining the proxy address for that first device from the device table, and accessing that first device using the proxy address through the communication channel via the first and second aggregators.

As such, the present invention provides a method for control points to discover all devices in the network and to control devices regardless of network configuration. By discovering all devices in the network, control points can perform more operations without limitation. Such a method further provides home federation by aggregating control points in different home networks. Further, home networks are typically connected to Internet Service Provider (ISP)s using gateways, wherein the gateways usually implement either Network Address Translation (NAT) or firewall which isolates home network outside of network. According to another embodiment of the present invention, by aggregating control points in different homes, control points can perform operations on devices from another home network or aggregate operations to create a new operation.

Other embodiments, features and advantages of the present invention will be apparent from the following specification taken in conjunction with the following drawings.

DETAILED DESCRIPTION OF THE INVENTION

In one embodiment, the present invention provides a method and system whereby the control points in a network can discover all of devices in the network and to control the devices by using communication a channel between control points regardless of network configuration. By discovering all devices in the network, control points can perform more operations without limitation.

Figure 1:
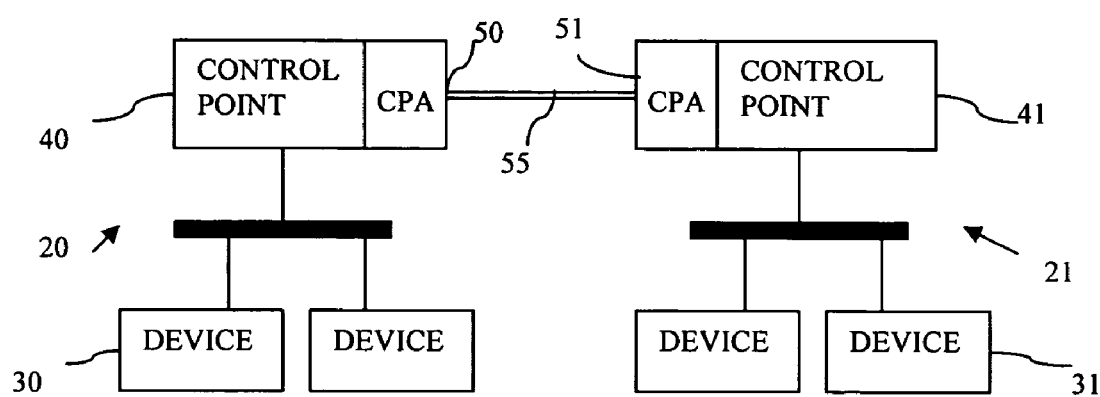
FIG. 1 shows an example functional block diagram of a network implementing control point aggregation according to an embodiment of the present invention.

FIG. 1 shows an example functional block diagram of a network 10 that implements a system for aggregating control points according to an embodiment of the present invention. In this example, the network 10 comprises two virtual networks 20 and 21. Network 20 includes a control point 40, devices 30 that can be controlled by the control point 40, and a control point aggregator (CPA) 50. Network 21 includes a control point 41, devices 31 that can be controlled by the control point 41 and a control point aggregator (CPA) 51. Though one control point is shown in each of the networks 20, 21, those skilled in the art will recognize that each network can include two or more controllers. In this description, the terms controller and control point are used interchangeably. A controller (CP) can comprise a remote control, a TV Set-top Box (STB), a PC, a DVD player, etc.

The networks 20 and 21, though physically connected, are logically isolated wherein devices and controllers in one network cannot access the controller and devices of another network without the CPAs 50 and 51. The two CPAs 50, 51 create an explicitly addressed communication channel 55 between the two isolated networks 20 and 21 and allow the controller in one network to discover and control devices in the other network.

For example, in a home network it is possible that a controller (e.g., remote control, terminal, etc.) is not able to see all the controllable devices. That may be because, e.g., some of the devices are on some other network (with a different network protocol, firewall or on the other side of a router) that the controller cannot discover with a multicast message, or there is no permission to access those other devices, or the other devices are in another physical location, or though they are on the same type of network they are out of the controller's domain, etc. This is because basic device discovery within a network is typically limited to the devices within the domain (scope) of that network, and does not span to discovery of devices in other networks.

According to one embodiment of the present invention, for a controller in one network to control devices in another network, the controllers in the two networks are aggregated such that the controllers 40 and 41 communicate with one another. In the case of the example networks 20 and 21 in FIG. 1, the controllers 40 and 41 communicate via the explicitly addressed communication channel 55 between the aggregators 50, 51, so that the first controller 40 (e.g., remote control) in the first network 20 (e.g., Ethernet network) can control a device 31 (e.g., TV) in the second network 21 (e.g., 1394 network).

The CPA 51 allows the second controller 41 to function as a proxy for the first controller 40 such that the first controller 40 can control the second devices 31 through the second controller 41. Similarly, the CPA 50 allows the first controller 40 to function as a proxy for the second controller 41 such that the second controller 41 can control the first devices 30 through the first controller 40.

The CPAs 50, 51 establish the communication channel 55 that allows the controllers 40 and 41 to share information. As a result, the device discovery scope in the networks 20, 21 is combined at the controllers, as opposed to bridging the networks 20 and 21. As such, a controller in one network can act as a proxy for a controller in the other network, and vice versa.

The link 55 between the two CPAs 50, 51 can be pre-setup or there can be a discovery process where the two CPAs 50, 51 share information between the two networks. This allows both of the controllers 40 and 41 to "see" all the devices 30, 31 in the networks 20, 21. This is transparent to the devices 30, 31 so that when a device 30 receives a command from the local controller 40, the device 30 is unaware whether the command was initiated from the local controller 40 itself, or whether the command was initiated from the controller 41 and that the local controller 40 is acting as a proxy for the controller 40.

In one example, the CPAs 50 and 51 comprise software executing on controllers 40 and 41 themselves, respectively. Each controller may further include multiple network interface types to communicate with other controllers on different types of networks. In another case, though the two networks 20, 21 are of the same type (e.g., both are Ethernet), the device discovery process in each network is limited to only devices in each network because the other network is in another domain. As noted, local (basic) device discovery is limited by a scope so that the packets in a network only travel a certain distance within each domain.

In the example of FIG. 1, the channel 55 between the CPAs 50 and 51 can be an explicit link between the two networks 20, 21 (i.e., one or both networks know each other's IP addresses) so that the networks 20, 21 can communicate with each other directly for access. However, the basic device discovery in one network cannot find the devices on the other network without utilizing the CPAs 50, 51. The channel 55 allows the controllers 40 and 41 to become aware of each other via the action of the CPAs 50, 51, not through the local discovery process, but for example, by user intervention, through specific instruction, etc.

Figure 2:
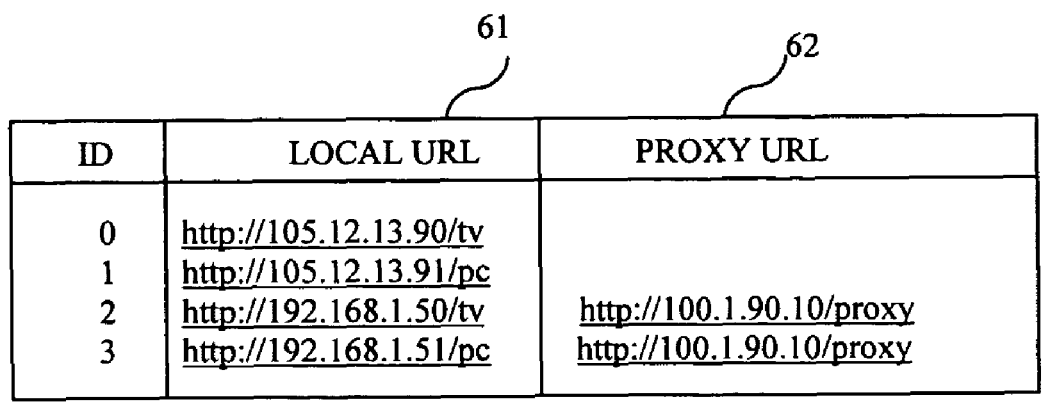
FIG. 2 shows an example of a device table in a control point aggregator of FIG. 1.

In the example embodiment described herein, the CPAs 50, 51 utilize proxy implementation, wherein each of the controllers 40 and 41 maintains a proxy device table 60 as shown by example in FIG. 2. Each device table 60 includes local URLs 61 and proxy URLs 62 with the mapping therebetween. Local URLs 61 are used in controlling local devices by the local controller, and proxy URLs 62 are used in controlling proxy devices by the remote controller.

For a device in a network, the device's local URL address is used by the local controller, and the device's proxy URL address is used by the remote controller. For example, the local URL for devices 30 is used by the local controller 40, and the proxy URL for devices 30 is used by the controller 41, and vice versa.

For example, if the controller 41 is to control a device 30, the controller 41 receives from the local CPA 51, a proxy URL which points to the remote (external) CPA 50 in the controller 40, wherein the remote CPA 50 in the controller 40, acts as a proxy for the controller 41 for accessing/controlling the device 30. In another example, in the network 21, local URLs 61 for the devices 31 are used by the local controller 41 to control the devices 31, and the proxy URLs 62 for the devices 31 are used by the remote controller 40 to control the devices 31.

Only the controllers 40 and 41 have knowledge of devices 30 and 31. The devices 30 have no direct knowledge of devices 31, and vice versa. As such, in one example, for communication between devices 30 and 31, the controller 41 controls device 31 to communicate with device 30. The controller 41 introduces the devices 30 and 31 to one another.

For the device 31 to access a device 30, the device 31 uses the proxy URL 62 for the device 30. That proxy URL 62 is passed to the controller 41 and CPA 51, and is translated to the local URL 61 for device 30 at the CPA 50 of the controller 40. The controller 40 then emits the local URL 61 for device 30 to access the device 30 in the network 20.

Both CPAs 50, 51 maintain device tables for mapping between local and proxy URLs 61, 62, respectively. As such, the CPA 50 maintains the local URL addresses 61 (local mappings) for its local devices 30, and sends the proxy URL addresses 62 of devices 30 to the CPA 51. Likewise, the CPA 51 maintains the local URL addresses 61 for its local devices 31, and sends the proxy URLs 62 of the devices 31 to the CPA 50. When a CPA receives proxy URLs 62 from a local device, it passes the proxy URL to the remote CPA, as this indicates that the local device is attempting to access a remote device. For example, when the CPA 51 receives proxy URLs 62 from a local device 31, it passes the proxy URL to the remote CPA 50, as this indicates that the local device 31 is attempting to access a remote device 30.

In one example, each CPA looks to its associated controller as a set of logical devices. As such, for example, the software in the controller 40 views the CPA 50 as if it is its neighboring devices. The controller 40 itself may not know that it includes a CPA because the CPA can be a virtual device to the controller 40 depending on configuration. In this configuration, the CPA is logically separated from the controller, allowing standard controller software to be used.

Figure 3:
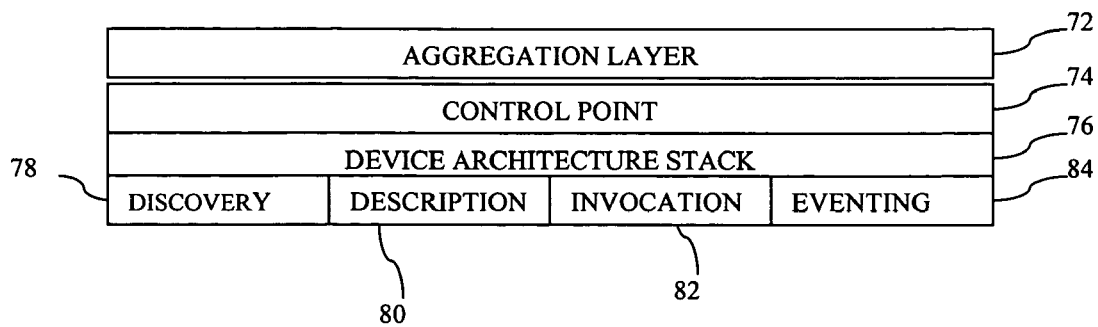
FIG. 3 shows an example process layer for a control point aggregator of FIG. 1.

FIG. 3 shows example logical processing layers 70 for the CPAs 50, 51, including an aggregation layer 72, a control point layer 74 and a device architecture stack layer 76. The architecture stack layer 78 includes a description layer 80, an invocation layer 82 and an eventing layer 84.

The aggregation layer 72 provides communication among the control points 40, 41.

The discovery layer 78 responds to local device discoveries from the control point layer 74 and forwards the discovery result to the remote control points through the aggregation layer 72. The discovery layer 78 is also invoked by other control points through the aggregation layer 72 to update the device table in FIG. 2. The update includes information about devices that are on other networks and their proxy URLs.

The description component 80 is invoked by remote control points through the aggregation layer 72 and forwards the description request to local devices through the control point layer 74. The result of this request is sent back to the aggregation layer 72 and ultimately the remote CP.

The invocation layer 82 is invoked by other control points through the aggregation layer 72 and forwards a remote control invocation to local devices through the control point layer 74. Any results from this path are referred by the same path.

The eventing layer 84 responds to local device events (e.g., media removed, position updates, etc.) and forwards them to other control points through the aggregation layer 72. The remote CP can then see and interpret these events.

Figure 4:
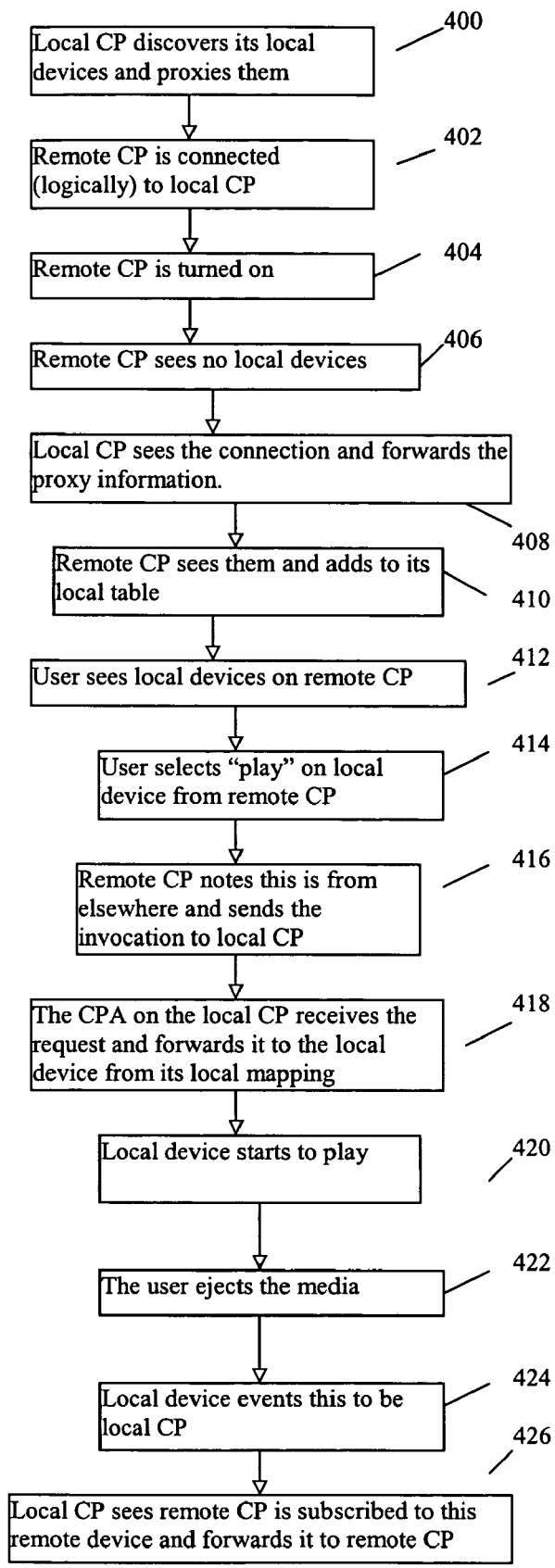
FIG. 4 shows a flowchart of sequence of steps performed by each of the CPA layers shown in FIG. 3.

FIG. 4 shows a flowchart of example operation scenario with a sequence of steps performed by each of the CPA layers shown in FIG. 3. The steps include:

Local CP discovers its local devices and proxies them (step 400).
Remote CP is connected (logically) to local CP (step 402).
Remote CP is turned on (step 404).
Remote CP sees no local devices (step 406).
Local CP sees the connection and forwards the proxy information (step 408).
Remote CP sees them and adds to its local table (step 410).
User sees local devices on remote CP (step 412).
User selects "play" on local device from remote CP (step 414).
Remote CP notes this is from elsewhere and sends the invocation to local CP (step 416).
The CPA on the local CP receives the request and forwards it to the local device from its local mapping (step 418).
Local device starts to play. An confirming OK is sent back by the reverse path (step 420).
The user ejects the media (step 422).
Local device events this to the local CP (step 424).
Local CP sees remote CP is subscribed to this remote device and forwards it to remote CP (step 426).

Once devices are discovered by the method described herein, device invocation and events can be sent directly to the remote device if a directly addressable network path is found. Otherwise, device invocations and events follow the same path as remote discovery by being sent from the local CP to the remote CP and then on to the remote device. Events follow the reverse path and flow from the remote device to remote CP where they are forwarded to the local CP.

As those skilled in the art will recognize, the controllers and devices are logical device types, and as such it is possible for a unit to contain both a controller and a device. Further, the control point functionality can be incorporated into a device.

The present invention provides a method for control points to discover all devices in the network and to control devices regardless of network configuration. By discovering all devices in the network, control points can perform more operations without limitation. Such a method further provides home federation by aggregating control points in different home networks. Further, home networks are typically connected to Internet Service Provider (ISP)s using gateways, wherein the gateways usually implement either Network Address Translation (NAT) or firewall which isolates home network outside of network. According to an embodiment of the present invention, by aggregating control points in different homes, control points can perform operations on devices from another home network or aggregate operations to create a new operation.

For example, as noted many middlewares for networks such as home networks use two device types: control points (controllers) and controlled devices. Control points manipulate devices by discovering devices and controllers. The present invention allows for control points to discover all devices in a network in order to control all the devices. However, there are cases where control points can discover only a limited number of devices or control only a few of the devices because of network configuration (such as multiple routers) or usage of special hardware (such as firewire).

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures in FIGS. 1-3, according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of aggregating control point information in a first home network, the method comprising:
   at a first control point aggregator in the first home network, acquiring information regarding one or more control points located in a second home network, wherein the information was compiled by intercepting multicast discovery requests in the second home network at a second control point aggregator in the second home network, wherein the one or control points located in the second home network are not discoverable directly by control points in the first home network due to the presence of at least one firewall between the first home network and the second home network;
   storing the information in a data structure at the first control point aggregator;
   receiving, at the first control point aggregator, a multicast discovery request from a first control point in the first home network, the multicast discovery request intended to discover all available devices in the first home network;
   accessing the data structure to retrieve the information regarding the one or more control points located in the second home network;
   forwarding the discovery request to the one or more control points located in the second home network using the information from the data structure.

2. The method of claim 1, wherein the information includes an address of a controller located in the second home network that can act as a proxy for the one or more control points located in the second home network.

3. The method of claim 1, wherein the one or more control points located in the second home network are not discoverable directly by control points in the first home network because the second home network is located on another side of a gateway as the first home network and the gateway implements network address translation.

4. The method of claim 1, wherein the one or more control points located in the second home network are not discoverable directly by control points in the first home network because the second home network is located on another side of a firewall as the first home network.

5. The method of claim 1, wherein the one or more control points located in the second home network are not discoverable directly by control points in the first home network because the second home network is only accessible using a different protocol than the first home network.

6. The method of claim 5, wherein the first home network is a Universal Plug and Play (UPnP) network and the second home network is a Home Audio Visual Interoperability Architecture (HAVi) network.

7. The method of claim 1, wherein the first control point aggregator further acts as a proxy for the first control point in the first home network so that the second control point aggregator can access the first control point in the first home network.

8. The method of claim 1, wherein the acquiring information is performed by directly addressing a previously-known address for the first control point aggregator in the second home network.

9. A first home network comprising:
   one or more control points;
   a firewall logically separating the first home network from the second home network such that the one or more control points in the first home network cannot discover control points in the second home network;
   a first control point aggregator adapted to:
      aggregate control point information from the second home network by directly addressing a second control point aggregator in the second home network using a previously known address for the control point aggregator in the second home network, wherein the second control point aggregator gathers control point information about the second home network via interception of multicast discovery requests from control points in the second home network;
      aggregate control point information from the first home network by discovering the one or more control points in the first home network;
      respond to a multicast discovery request from a control point in the first home network by providing at least aggregated control point information from the second home network; and
      respond to a multicast discovery request from the second control point aggregator in the second home network by providing at least aggregated control point information from the first home network.

10. The first home network of claim 9, wherein the first control point aggregator is located on the firewall.

11. The first home network of claim 9, wherein the control point information from the second home network includes proxy addresses for each of one or more control points in the second home network.

12. The first home network of claim 9, further comprising a controller corresponding to the first control point aggregator.

13. The first home network of claim 9, wherein both the first home network and the second home network are Internet Protocol (IP) networks.

14. A control point for use in a first home network having one or more control points, the control point comprising:
    a processor;
    a memory; and
    a first control point aggregator, comprising:
        a control point layer;
        an aggregation layer, wherein the aggregation layer provides communication among the control points and a second control point aggregator in a second home network, wherein the first home network and the second home network are separated by a firewall; and
        a device architecture stack layer including:
            a discovery layer which responds to control point discovery requests from the control point layer and forwards the discovery result to the second control point aggregator in the second home network via the aggregation layer, and which is invoked by control points through the aggregation layer to update control point information stored on the first control point aggregator;
            a description layer, which is invoked by control points in the second home network through the aggregation layer and forwards description request to control points in the first home network through the control point layer;
            an invocation layer, which is invoked by control points through the aggregation layer and forwards a control point invocation to control points through the control point layer; and
            an eventing layer, which responds to control point events and forwards them to other control points, including control points in the second home network, through the aggregation layer.

15. The control point of claim 14, wherein a result of a description request is sent back to the aggregation layer and ultimately to a control point in the second home network.

16. The control point of claim 14, wherein the first home network is a UPnP network and the second home network is a HAVi network.

17. The control point of claim 14, wherein the first home network is a HAVi network and the second home network is a UPnP network.

18. A non-transitory program storage device readable by a machine tangibly embodying a program of instructions executable by the machine to perform a method of aggregating control point information in a first home network, the method comprising:
    at a control point aggregator in the first home network, acquiring information regarding one or more control points located in a second home network, wherein the one or control points located in the second home network are not discoverable directly by control points in the first home network due to the presence of at least one firewall between the first home network and the second home network;
    storing the information in a data structure;
    receiving a discovery request from a first control point in the first home network;
    accessing the data structure to retrieve the information regarding the one or more control points located in the second home network;
    forwarding the discovery request to the one or more control points located in the second home network using the information from the data structure.

19. The non-transitory program storage device of claim 18, wherein the information includes an address of a controller located in the second home network that can act as a proxy for the one or more control points located in the second home network.

20. The non-transitory program storage device of claim 18, wherein the one or more control points located in the second home network are not discoverable directly by control points in the first home network because the second home network is located on another side of a gateway as the first home network and the gateway implements network address translation.

21. The non-transitory program storage device of claim 18, wherein the one or more control points located in the second home network are not discoverable directly by control points in the first home network because the second home network is located on another side of a firewall as the first home network.

22. The non-transitory program storage device of claim 18, wherein the one or more control points located in the second home network are not discoverable directly by control points in the first home network because the second home network is only accessible using a different protocol than the first home network.

23. The non-transitory program storage device of claim 22, wherein the first home network is a Universal Plug and Play (UPnP) network and the second home network is a Home Audio Visual Interoperability Architecture (HAVi) network.

24. The non-transitory program storage device of claim 18, wherein the first control point aggregator in the first home network acquires the information by querying a second control point aggregator in the second home network.

25. The non-transitory program storage device of claim 18, wherein the first control point aggregator further acts as a proxy for the first control point in the first home network so that the second control point aggregator can access the first control point in the first home network.

26. The non-transitory program storage device of claim 18, wherein the acquiring information is performed by directly addressing a previously-known address for the second control point aggregator in the second home network.

27. The method of claim 1, wherein the first home network and the second home network use the same home networking protocol.

* * * * *